United States Patent
Miyazawa et al.

(10) Patent No.: US 6,349,281 B1
(45) Date of Patent: *Feb. 19, 2002

(54) VOICE MODEL LEARNING DATA CREATION METHOD AND ITS APPARATUS

(75) Inventors: Yasunaga Miyazawa; Hiroshi Hasegawa; Mitsuhiro Inazumi; Tadashi Aizawa, all of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,799

(22) Filed: Jan. 22, 1998

(30) Foreign Application Priority Data

Jan. 30, 1997 (JP) ............................................. 9-017204

(51) Int. Cl.⁷ ............................................. G10L 15/06
(52) U.S. Cl. ....................................... 704/256; 704/246
(58) Field of Search ............................... 704/231, 234, 704/232, 243, 244, 245, 256, 246

(56) References Cited

U.S. PATENT DOCUMENTS

| 4,802,224 A | * | 1/1989 | Shiraki et al. ................. 381/41 |
| 4,829,577 A | * | 5/1989 | Kuroda et al. ................. 381/45 |
| 4,882,759 A | * | 11/1989 | Bahl et al. ...................... 381/51 |
| 5,375,173 A | * | 12/1994 | Sanada et al. ................. 381/43 |
| 5,787,394 A | * | 6/1998 | Bahl et al. .................... 704/238 |
| 5,845,246 A | * | 12/1998 | Schalk ......................... 704/243 |
| 5,903,865 A | * | 5/1999 | Ishimitsu et al. ............ 704/256 |
| 6,163,768 A | * | 12/2000 | Sherwood et al. .......... 704/235 |

FOREIGN PATENT DOCUMENTS

| JP | 6-4079 | 1/1994 |
| JP | 6-119476 | 4/1994 |

OTHER PUBLICATIONS

IEEE "The IEEE standard dictionary of electrical and electronics terms" pp. 627,287, 1996.*
Choukri et al "Adaption of automatic speech recognizers to nes speakers using canonical correlation analysis techniques" Computer speech and language, pp. 95–107, 1986.*
Ishii et al "Speaker independent acoustic modeling using speaker normalization" IEEE Acoustic speech and signal processing, pp. 97–100, May 15, 1998.*

* cited by examiner

Primary Examiner—William Korzuch
Assistant Examiner—Daniel Abebe
(74) Attorney, Agent, or Firm—Oliff & Berridge

(57) ABSTRACT

A voice model learning data creation method and apparatus makes possible the creation of an inexpensive voice model in a short period of time when creating a voice model for a new word not in a preexisting database. Verbal data from several persons is selected from among the verbal data held in the database. This selected verbal data is referred to as standard speaker data, and is stored in a standard speaker data storage component. The remaining verbal data in the preexisting database is designated as learning speaker data, as is stored in a learning speaker data storage component. A data conversion function from the standard speaker data space to the learning speaker data space is derived. Then, the learning data for the new word is created by the data conversion function. Thus, the data which is obtained from the standard speaker speaking the new word is converted to the learning speaker data space.

6 Claims, 7 Drawing Sheets

VOICE MODEL LEARNING DATA CREATION METHOD AND ITS APPARATUS

BACKGROUND OF THE INVENTION

1. Field of Invention

The present invention relates to a voice recognition learning data creation method and an apparatus which creates learning data in order to learn the voice model used for unspecified speaker voice recognition.

2. Description of Related Art

As one of the voice recognition technologies used for unspecified speakers, there is the voice recognition technology which uses the Dynamic Recurrent Neural Network (DRNN) voice recognition model. Applicants have completed the submission of applications concerning voice recognition technology accomplished by DRNN, as Japanese Laid Open Patents hei 6-4079 and hei 6-119476.

In the DRNN voice model, a characteristic vector series of some words is input as time series data. Then, in order to obtain an appropriate output for the words, there is a build up between each unit in accordance with a pre-learning precedent and a bias which is respectively determined. As a result, an output is obtained in relation to spoken voice data of non-specified speakers which is close to the taught output for the words.

For example, the time series data of the characteristic vector series of the words "ohayo—good morning" of some unspecified speaker is input. Then, in order to obtain an output which is close to the taught output which is ideally output for the words "ohayo—good morning", data for each respective two dimensions of the characteristic vector in each time of the words "ohayo—good morning" are applied to the corresponding input unit and converted by the established buildup of the learning precedent and bias. Time series processing is then performed for the time series data of each of the characteristic vector series of some input single word. As a result, output which is close to the taught output for the word is obtained for the voice data spoken by some non-specified speaker.

With regard to the DRNN voice model prepared for all of the words which should be recognized, the learning precedent which changes the buildup to obtain an appropriate output for the respective words is recorded from pages 17–24 of the communications sounds technological report of the electronic information communications association publication "Technical Report of IEICI sp 92–125 (1993–01)."

The present invention is not limited to the DRNN voice model. At the time of creating a voice model using unspecified speaker voice recognition, a database is used in which the learning data is created from the speech data for the spoken words (for example, about 200 words) of several hundred people. Ordinarily a voice model is created which accomplishes learning on the basis of the learning data included in the database.

However, there are cases in which a voice model is created for words which are not in the database and which must be obtained from the user. Prior to this invention, when creation of a voice model was accomplished for words not in the database, several hundred persons were asked to say the words and learning data for the words was created using these as a source of the spoken data. Hence, there was a need to create a voice model based on the learning data.

Whenever a voice model was created for new words, it was necessary to gather several hundred people in order to create learning data for learning the voice model. Consequently, a great amount of time was required to create the voice model, with another problem being that it was high in terms of cost.

SUMMARY OF THE INVENTION

In accordance with the present invention, a voice recognition model of words which are not included in the database can be created by creating a learning data of several hundred people using the spoken data of a selected individual or several people. It is thus an object of the present invention to provide a voice model learning data creation method and a voice model apparatus that can generate a voice model for new words in a short period of time and at low cost.

The voice model learning data creation method according to the present invention creates learning data in order to learn the speech model of voice recognition. The voice model learning data creation method creates standard speaker data for spoken data of at least one individual from among the spoken data obtained from a number of speakers which are held in a preestablished database. In addition, learning speaker data is obtained from the database. A conversion coefficient is created for converting standard spoken data into learning speaker data using the preestablished word data. In order to create the learning data for new words, data is obtained from standard speakers which speak the new words, and the data is converted to the learning speaker data space using the conversion coefficient. Thus, learning data is created for new words.

In the case when a voice model is created for new words which do not exist in the database, a voice model can be created from the learning data of the words on the basis of the speaker data of a few individual standard speakers. In order to create a speech model relative to the new words, the need for creating learning data by collecting the speaker data of several hundred individuals as with the conventional art is no longer necessary, and a voice model is created in a short time and at low cost.

In addition, data which exists in the standard spoken data space and the learning spoken data space is stored as a characteristic vector for the respective words obtained by analyzing the frequency of voice signals. The process for converting the data obtained from standard speakers who say new words is accomplished by using differential vectors for the characteristic vectors representing the respective new words in the standard speaker data space and in the learning speaker data space.

If a characteristic vector (for example, data which is manifest by an LPC (cepstrum—phonetic) coefficient having 10 dimensions) obtained by the frequency analysis of voice signals is used, high precision data is obtained. Furthermore, since utilization is made of preobtained differential vectors and conversion of data is made from the standard speaker data space to the learning speaker data space, data conversion is accomplished simply and with high precision.

In addition, data existing in the standard speaker data space and the learning speaker data space is code data which quantizes the characteristic vectors for each of the respective words obtained through the frequency analysis of the voice signal. In addition, the process for converting the data obtained from the speech of standard speakers for new words converts it to the learning speaker data space using the conversion coefficient. The process accomplishes the data conversion of the code data which obtains the vector quantized code data from the standard speaker data for new word data and converts the data from the standard speaker data space to the learning speaker data space by mapping in the learning speaker data space.

In other words, the invention accomplishes processing by vector quantizing the characteristic vectors obtained through the frequency analysis of voice signals. Although the data becomes slightly rough, the processing time is shortened and simplified.

In addition, the voice model learning data creation apparatus of the present invention creates learning data in order to learn the voice model used in voice recognition. The apparatus is provided with a standard speaker data storage component which stores the spoken data of at least one individual selected from the spoken data obtained from many individuals which is held in a preestablished database. A learning speaker data storage component stores spoken data of other than standard speakers as a learning speaker database. An artificial learning word data creation component has a data conversion component which, using a preobtained conversion coefficient, accomplishes data conversion from the standard speaker data space to the learning speaker data space. An effective learning data component stores the data created by the artificial learning word data creation component. At the time of creating the learning data for the new words, data which is obtained from the speech of standard speakers including the new words is converted into the learning speaker data space using the conversion coefficient. Learning data is created using the artificial learning word data for the new words.

In the case where a voice model for new words which are not included in the database is created, the creation of the learning data of those words can be made on the basis of the spoken data spoken by a small number of standard speakers. Thus, the need for creating learning data by gathering together several hundred people to obtain speaker data in order to create voice data for the new words, as was required with the conventional art, is no longer necessary. Therefore, a voice model can be created in a short period of time.

In addition, the standard speaker data which is stored in the standard speaker data storage component and the learning data which is stored in the learning data storage component are characteristic vectors for the words respectively obtained through the frequency analysis of the voice signals. In addition, the process of converting data obtained from the speech of standard speakers for the new words into learning speaker data using the conversion coefficient is accomplished using the characteristic vectors. The characteristic vectors represent the respective words in the standard speaker data space, and the differential vectors of the characteristic vectors represent the respective words in the learning speaker data space.

The data creation method uses the characteristic vectors obtained through the frequency analysis of voice signals and obtains data with high precision. By using the differential vector which has been preobtained, data conversion is accomplished from the standard speaker data space to the learning speaker data space. Thus, data conversion can be accomplished simply and with high precision.

In addition, the standard speaker data which is housed in the standard speaker data storage component and the learning speaker data which is housed in the learning speaker data storage component are the vector quantized code data of the characteristic data for each of the respective words obtained through the frequency analysis of the voice signals. The process for converting the data obtained from the speech of standard speakers for new words into learning speaker data space using the conversion coefficient uses the vector quantized code data in the standard speaker data space for the new word data to accomplish the data conversion from the standard speaker data space to the learning speaker data space by mapping the code data in the learning speaker data space.

In other words, the invention accomplishes the vector quantization of characteristic vectors obtained through the frequency analysis of voice signals. Although the data becomes slightly rough, the more simplified processing shortens the processing time, and the memory which houses the standard speaker data and the learning speaker data can be made with a small capacity.

DETAILED DESCRIPTION OF PREFERRED EMBODIMENTS

An explanation of an embodiment of the invention is provided hereafter.

Figure 1:
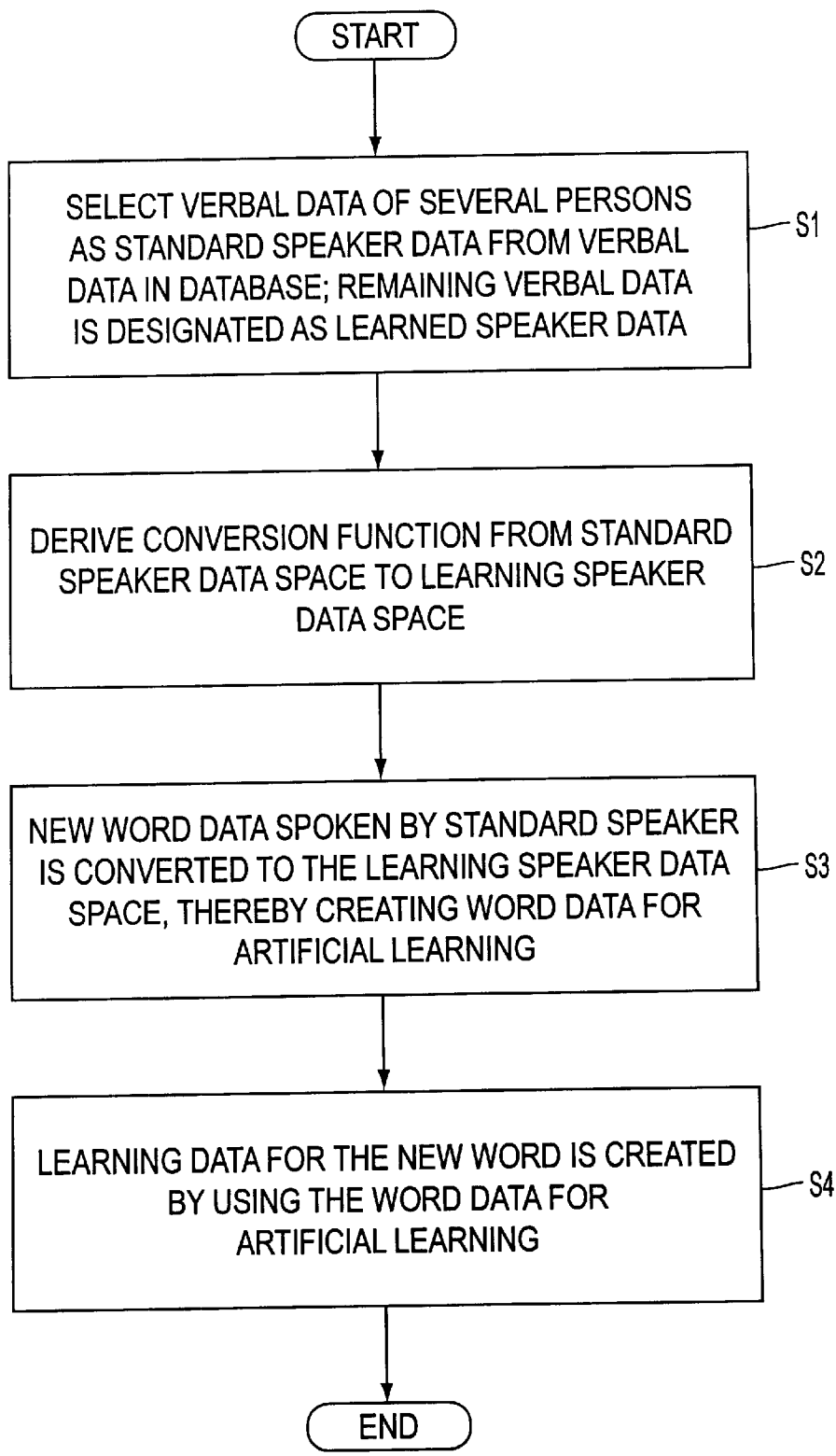
FIG. 1 is an operational flowchart describing the schematic process of the present invention.

FIG. 1 is an operational flow chart which explains the learning data creation method according to a first embodiment of the present invention. In FIG. 1, selection is made of an optional number of persons (for example, 5) as the standard speakers from among several hundred people (in this instance, 300 people) whose voice data is held in a database. In step S1, the spoken data of the respective standard speakers becomes the standard speaker data. The other spoken data in the database becomes that of learning speakers, and the respective learning speaker spoken data is made to be the learning speaker data.

In step S2, the conversion coefficient from the respective standard speaker data space to the learning speaker data space is created using the word data (approximately 200 words) which has already been made into a database.

Based on the word data held as the database, the conversion coefficient from some standard speaker data space to the respective learning speaker data space is created using all of the words. The conversion coefficient from the standard speaker data space to the respective learning speaker data space is obtained relative to the respective learning speakers for each respective standard speaker.

Also, in the case of the data used for learning new words which do not exist in the database, the respective standard speakers are requested to say the new words. In step S3 the spoken data is converted into data in the respective learning speaker data space using the conversion coefficient, and the artificial learning word data of several hundred name units is created.

In step S4, the learning data of the new words is created using the word data used for artificial learning. Thus, when a voice model is created for new words which do not exist in the database, the learning data of the words is created on the basis of the spoken data produced by several hundred standard speakers. A detailed explanation is further provided with respect to the above process.

Figure 2:
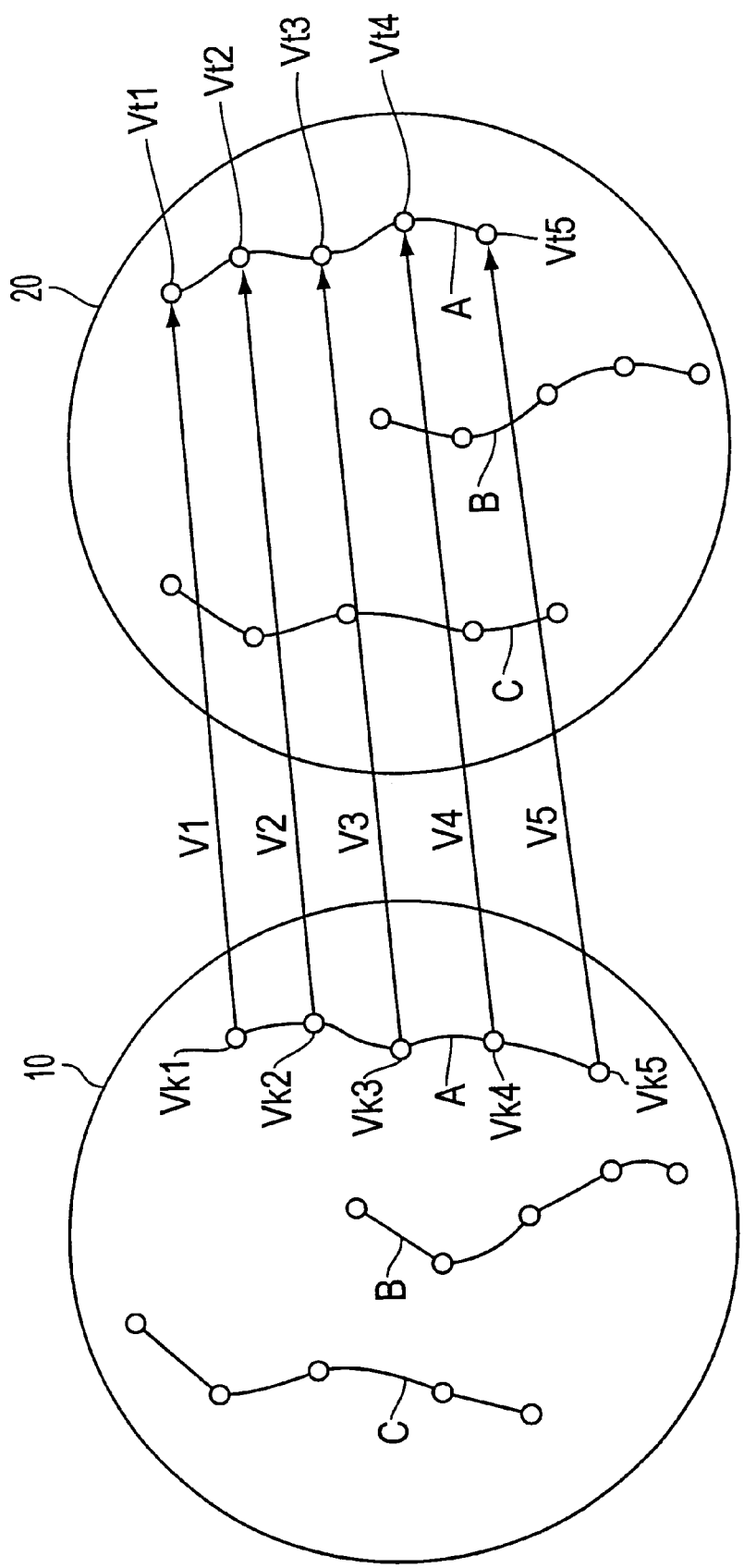
FIG. 2 shows the conversion function from standard speaker data to learning speaker data pursuant to a first embodiment of the present invention.

FIG. 2 represents the spoken data (for example the characteristic vector manifest by the 10 dimensional LPC (cepstrum—phonetic) coefficient) for some new words of some individual speakers (i.e. learning speakers of other than the standard speakers). The individual speakers are selected as the standard speakers from among the several hundred speakers whose spoken data is held by the database. Although data exists for approximately 200 word units, in this example, a characteristic vector is shown for three words.

With regard to FIG. 2, learning data of only 20 individuals and the standard speaker data of 10 individuals are shown. Also, each characteristic vector of three words, A, B, and C, in the standard speaker data space and the characteristic vector of the words A, B, and C in the learning speaker data space correspond to each other respectively. On the basis of the word data and the respective learning speaker data, the data coefficient is preestablished from the standard speaker space to the learning speaker space. In this example, use is made of a differential vector as the data conversion coefficient.

If the differential vector between the characteristic vector value $Vk1$ of the word A in the standard speaker data space and the characteristic vector value $Vt1$ of the word A in the learning speaker data space is designated as $V1$, then it would be expressed as follows:

$$Vt1=Vk1+V1.$$

In addition, if the differential vector between the characteristic vector value $Vk2$ of the word A in the standard speaker data space and the characteristic vector value $Vt2$ of the word A in the learning speaker data space is designated as $V2$, then it would be expressed as follows:

$$Vt2=Vk2+V2.$$

In other words, the characteristic vector value $Vt1$ of the learning speaker data space is obtained by adding the differential vector $V1$ to the characteristic vector $Vk1$ of the standard speaker data space. Similarly, the characteristic vector value $Vt2$ of the learning speaker data space is obtained by adding the differential vector $V2$ to the characteristic vector $Vk2$ of the word A in the standard speaker data space. Data conversion from the standard speaker data space to the learning speaker data space is achieved through this relationship. In the same way, the characteristic vector value $Vt3$ of the learning speaker data space is obtained by adding the differential vector $V3$ to the characteristic vector $Vk3$ of the standard speaker data space, the characteristic vector value $Vt4$ of the learning speaker data space is obtained by adding the differential vector $V4$ to the characteristic vector $Vk4$ of the standard speaker data space, and the characteristic vector value $Vt5$ of the learning speaker data space is obtained by adding the differential vector $V5$ to the characteristic vector $Vk5$ of the standard speaker data space.

By using such a conversion function, the verbal data of the new word obtained by the speaking of the standard speaker is converted to the learning speaker data space, thereby obtaining the word data for artificial learning with regard to the newly obtained word.

Figure 3:
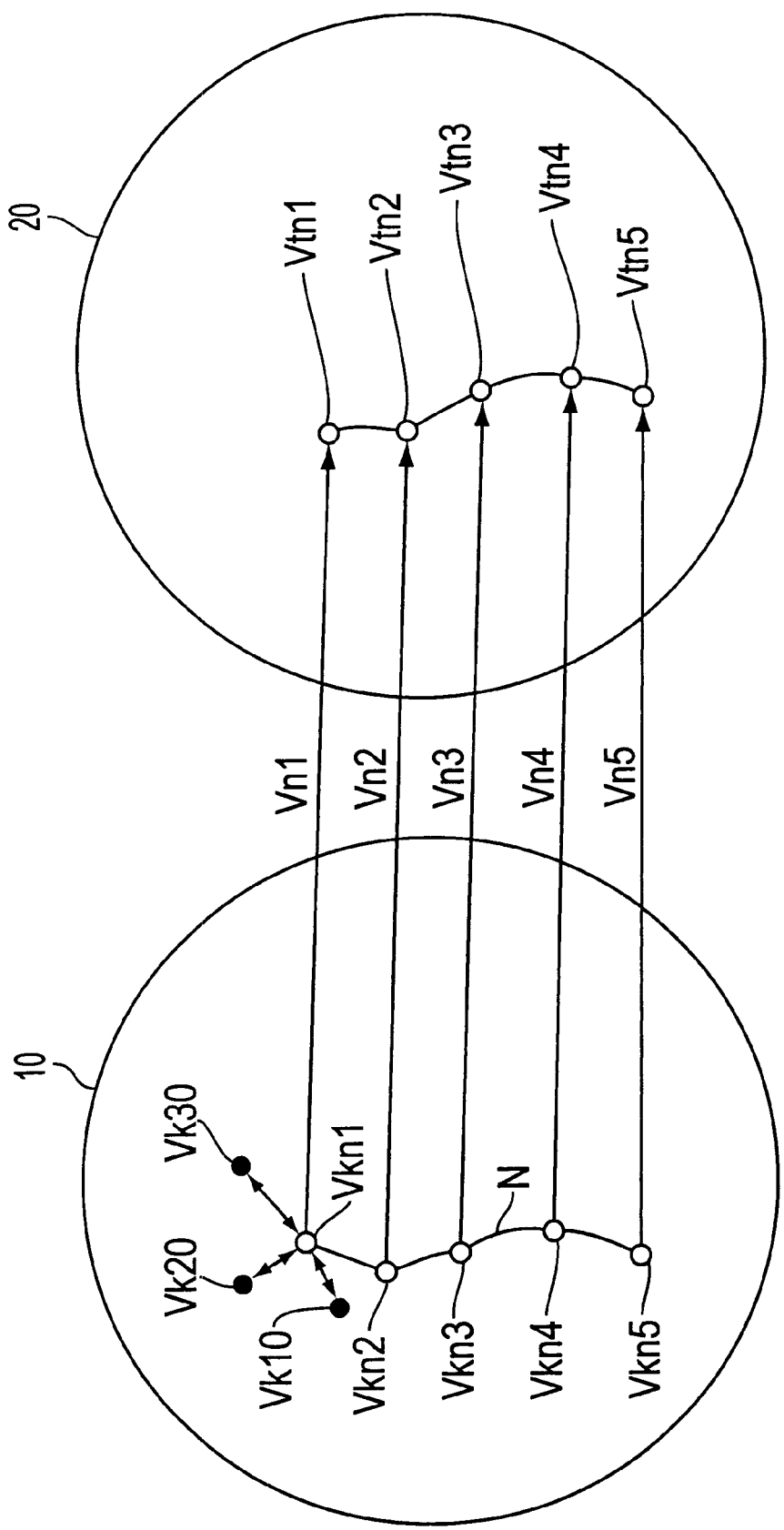
FIG. 3 shows the creation process of word data for artificial learning pursuant to the first embodiment of the invention.

FIG. 3($a$) shows the characteristic vector sequence for a certain standard speaker data space, which is obtained by the standard speaker speaking the new word N that is to be entered into the new database. The characteristic vector sequence is composed of the characteristic vectors $Vkn1$, $Vkn2$, ..., $Vkn5$, indicated by white circles in FIG. 3($a$). Of these characteristic vectors, $Vkn1$ will be considered in the following explanation.

In FIG. 3($a$), several characteristic vectors which exist in the positions nearest the characteristic vector $Vkn1$ are selected. $Vkn1$ represents the characteristic vector of about 200 words already being held in the database. A plurality of characteristic vectors which are composed of characteristic vector sequences that correspond to the 200 words are scattered in the space near the characteristic vector $Vkn1$. Several of the characteristic vectors which are near the characteristic vector $Vkn1$ of the word N are selected. Here, three characteristic vectors are selected which are near the characteristic vector $Vkn1$ (i.e., $Vk10$, $Vk20$ and $Vk30$, shown in the figure as black circles).

Furthermore, the three selected characteristic vectors $Vk10$, $Vk20$ and $Vk30$ each have a differential vector to the learning speaker data space. The differential vectors are designated as $V10$, $V20$ and $V30$, respectively. Using these differential vectors, the differential vector $Vn1$ is set in relation to the characteristic vector $Vkn1$. $Vn1$ is derived by:

$$Vn1=\mu1\cdot V10+\mu2\cdot V20+\mu3\cdot V30.$$

In this equation, $\mu1$, $\mu2$, and $\mu3$ are coefficients indicating weight. $\mu1$ is a weight that corresponds to the distance of $Vkn1$ and $Vk10$; $\mu2$ is a weight that corresponds to the distance of $Vkn1$ and $Vk20$; and $\mu3$ is a weight that corresponds to the distance of $Vkn3$ and $Vk30$. The size of the weights are established according to their respective distances, and the weighting is larger the nearer the distance. Moreover, the values are set so that $\mu1+\mu2+\mu3=1$.

The differential vector $Vn1$ that corresponds to the characteristic vector $Vkn1$ can be established, and using the differential vector $Vn1$, the single characteristic vector $Vkn1$ representing the characteristic vector sequence of the new word can be converted to the vector $Vtn1$ of the learning speaker data space by way of the following relationship:

$$Vtn1=Vkn1+Vn1.$$

In the same way, the respective differential vectors $Vn2$, $Vn3$, $Vn4$, and $Vn5$ can be derived for each of the other characteristic vectors $Vkn2$, $Vkn3$, $Vkn4$ and $Vkn5$, by way of the process described above. Using each of these differential vectors, the vectors $Vtn1$, $Vtn2$, $Vtn3$, $Vtn4$ and $Vtn5$ of the learning speaker data space can be calculated. FIG. 3($b$) shows the elements that are converted to the learning speaker data space by the characteristic vector sequence of the new word. This is referred to as word data for artificial learning.

The process described above is a process between the standard speaker data of one person and the learning speaker data of one person. However, since there are, in actuality, standard speaker data of several persons and learning speaker data for several hundreds of persons, the process is carried out similarly for each one.

According to the process described above, word data for artificial learning for each of the words that are not in the database originally must be created within the learning speaker data space for several hundreds of persons based on the data spoken by several standard speakers. Then, learning data is created by using the word data for artificial learning. Using this learning data, the DRNN voice model described above can be learned.

Figure 4:
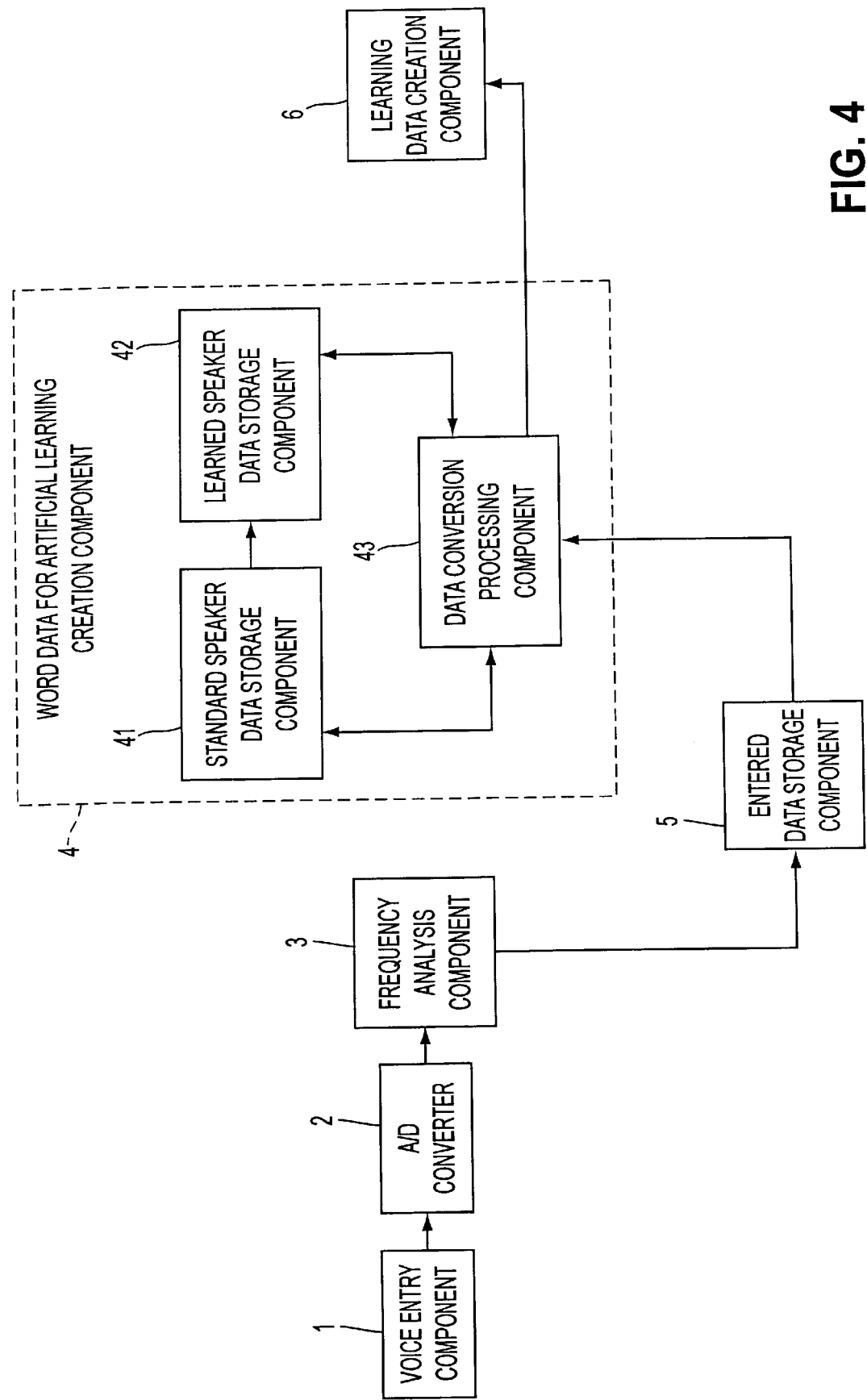
FIG. 4 is a block diagram showing an example of the composition of the apparatus of the first embodiment of the invention.

FIG. 4 shows the apparatus for realizing the first embodiment of the invention. The apparatus includes a voice entry component 1, an A/D converter 2, a voice analysis component 3, a word data for artificial learning creation component 4, an entered data storage component 5, and a learned data storage component 6.

The aforementioned word data for artificial learning creation component 4 is equipped with a standard speaker data storage component 41 for storing standard speaker data, a learned speaker data storage component 42 for storing learning speaker data, and a data conversion processing component 43. The artificial learning creation component 4 performs the process described above with reference to FIGS. 1–3.

With the freely selected several standard speakers from among the verbal data of the several hundred persons already held in the database (the characteristic vector), verbal data of each of the respective standard speakers is stored in the standard speaker data storage component 41. The verbal data (characteristic vector) of each of the respective learned speakers is stored in the learned speaker data storage component 42 as learned speakers. Further, the conversion function (differential vector) from the standard speaker data space to the learning speaker data space is created for each word using the 200 words. The data converter 43 performs the process described above based on the conversion functions, and hence, the data conversion is executed.

An explanation will be given for the process for creating the data for learning the new words not already in the database.

First, when a certain standard speaker speaks a new word, that voice is entered into the A/D converter 2 through the voice entry component 1. After being A/D converted, it is converted by the voice analysis component 3 to the characteristic vector that is indicated by, for example, the 10 dimensional LPC [phonetic: cepstrum]coefficient, and accumulated in the entered data storage component 5.

The entered data conversion component 43 selects several characteristic vectors existing in the nearest position from among the standard speaker characteristic vector which are in the periphery of the characteristic vector of the entered voice that is accumulated in the entered data storage component 5 within the standard speaker data space. The entered data conversion component 43 converts each of the selected characteristic vectors to learning speaker data using the differential vector derived previously. Thus, the word data for artificial learning is created within each of the learning data spaces, and such word data for artificial learning is stored in the learned data storage component 6.

When creating the voice model for new words not already in the database, it is possible to create learning data of such words based on the verbal data spoken by the several standard speakers. Accordingly, in order to create a voice model for new words, it is no longer necessary to accumulate verbal data from several hundred persons as has been done heretofore. Therefore, it is possible to create a voice model in a short period of time and at a relatively low cost.

With the first embodiment described above, processing is performed by using the characteristic vector that was indicated by the 10 dimensional LPC [cepstrum] coefficient. However, with the second embodiment of the invention, the process is performed by using the code vector of the characteristic vector indicated by the LPC [cepstrum] coefficient that undergoes vector quantization.

In other words, if there are about 30 characteristic vectors for each word when a word count of about 200 words is spoken by a particular standard speaker, then about 6000 characteristic vectors are obtained. After each of these undergo vector quantization, a standard speaker code book is created containing about 256 code vectors. Using this code book, a learned speaker code book is created by mapping each of the code vectors to the learning speaker data space. Hence, the process is performed by using these code books. This process will be described with reference to FIG. 5.

Figure 5:
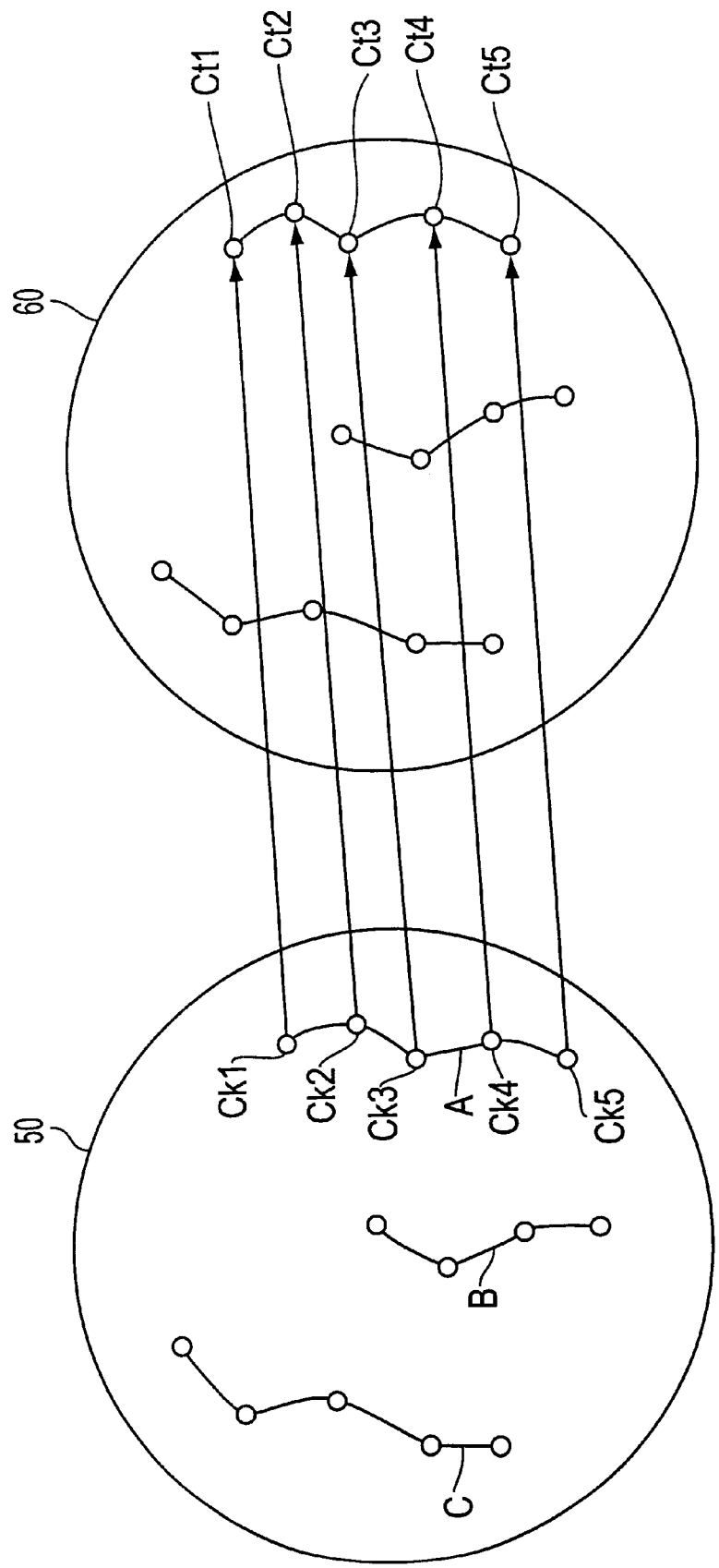
FIG. 5 shows the mapping from standard speaker data to learning speaker data pursuant to a second embodiment of the invention.

In FIG. 5, the standard speaker code book 50 shows only the code vector sequence for word A, word B, and word C used here, although there are 256 code vectors comprising code vector sequences for each word (about 200 words). Furthermore, the learned speaker code book 60 has the code vectors that are mapped for each of the words in the standard speaker code book 50. For example, the code vector Ck1 of the standard speaker code book 50 corresponds to the code vector Ct1 of the learned speaker code book 60, the code vector Ck2 of the standard speaker code book 50 corresponds to the code vector Ct2 of the learned speaker code book 60, and the code vector Ck3 of the standard speaker code book 50 corresponds to the code vector Ct3 of the learned speaker code book 60. Thus, each of the respective code books has a corresponding code vector.

Using this type of standard speaker code book 50 and learned speaker code book 60, new words can undergo vector quantization by the standard speaker code book 50. Those code vector sequences that undergo quantization can be mapped in the learned speaker code book 60, thereby creating the word data for artificial learning. This will be explained with reference to FIG. 6.

Figure 6:
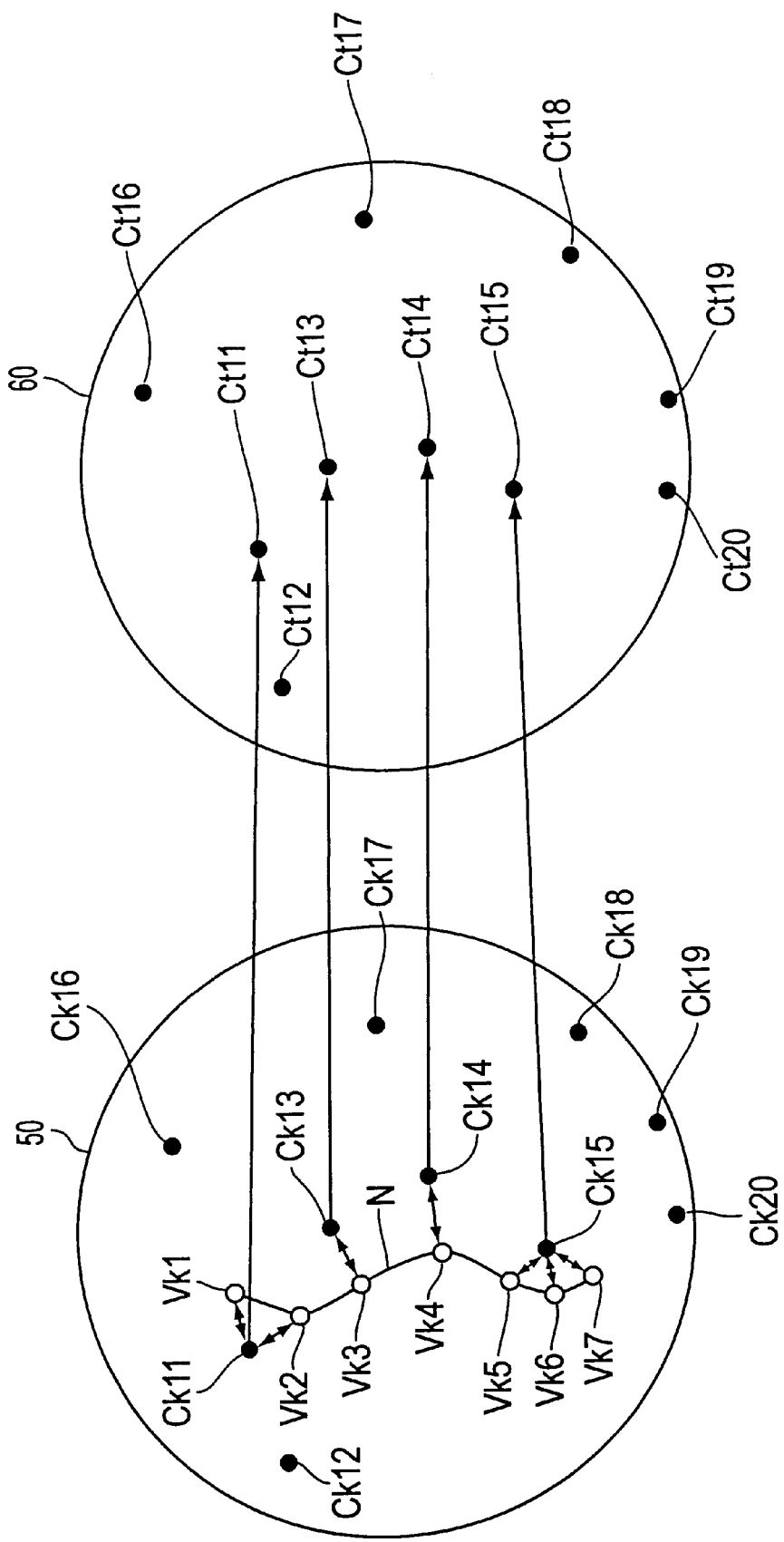
FIG. 6 shows the process for mapping to a learned speaker code book code vectors created by vector quantization of entered data pursuant to the second embodiment of the invention.

As shown in FIG. 6, the characteristic vector sequences of verbal data obtained from speech of the standard speaker are designated as Vk1, Vk2, Vk3, . . . , Vk7 for the word N which is being newly added to the database. This undergoes quantization as described below.

The standard speaker code book is designated to a size of 256, thereby including 256 unspecified speaker code vectors. These code vectors of the standard speaker code book 50 are indicated by Ck1, Ck2, Ck3, . . . , Ck256. In FIG. 6, only ten code vectors, Ck11, Ck12, . . . , Ck20, are shown for purposes of simplicity of the figure. These code vectors are indicated by the black circles in the figure.

The characteristic vector sequences of the new word N obtained from the speaking of the standard speaker are indicated in FIG. 6 by the white circles, and include the characteristic vectors Vk1, Vk2, Vk3, . . . , Vk7. The characteristic vector sequences undergo quantization with regard to the standard speaker code book 50.

In other words, the distance is calculated between each of the characteristic vectors of the characteristic vector sequences of the word N and between the code vectors Ck1, Ck2, Ck3, . . . , Ck256 which are scattered throughout the standard speaker code book 50. The code vector of minimum distance in relation to the characteristic vector is selected. For example, the first and second characteristic vectors Vk1 and Vk2 of the characteristic vector sequence for the word N are correlated to the code vector Ck11, the third characteristic vector Vk3 is correlated to the code vector Ck13, the fourth characteristic vector Vk4 is correlated to the code vector Ck14, and the fifth, sixth and seventh characteristic vectors Vk5, Vk6 and Vk7 are each correlated to the code vector Ck15. Thus, the characteristic vector sequences for the word N replace the code vector sequences of Ck11, Ck11, Ck13, Ck14, Ck15, Ck15, Ck15.

When the characteristic vector sequence of the new word undergoes quantization, the code vector of the word N obtained by quantization is mapped to the learned speaker code book 60. Since each of the code vectors of the standard speaker code book 50 and the learned speaker code book 60 are correlated together, the code vector Ck11 of the word N in the standard speaker code book 50 is mapped to the code vector Ct11 of the learned speaker code book 60, the code vector Ck13 is mapped to the code vector Ct13, the code vector Ck14 is mapped to the code vector Ct14, and the code vector Ck15 is mapped to the code vector Ct15. Therefore, the code vector sequence of the learned speaker code book 60 for the word N is indicated by Ct11, Ct11, Ct14, Ct14, Ct15, Ct15, Ct15.

As described above, based on the learning speaker voice data entering the database, the learned speaker code book for several hundred persons and the standard speaker code book for several persons are created for each speaker, respectively. The code vector sequences are obtained by the vector quantization of characteristic vector sequences that are obtained by the standard speaker speaking the new word. The word data for artificial learning is created in the learned speaker code book by mapping the code vector sequence into the learned speaker code book. The learned data is created by using the word data for artificial learning, and using this learned data, the DRNN voice model as described above is learned.

Figure 7:
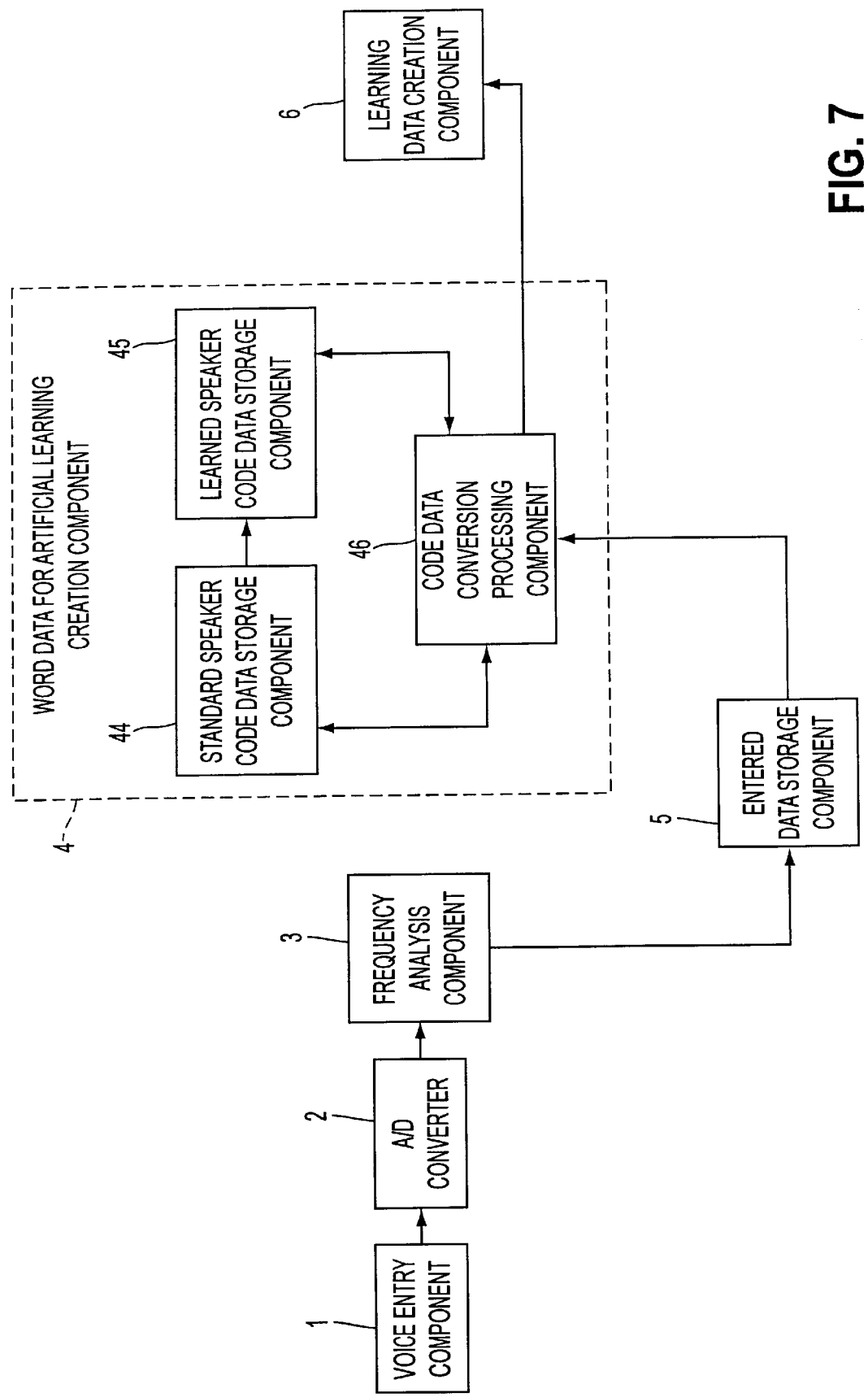
FIG. 7 is a block diagram showing an example of the composition of the apparatus of the second embodiment of the invention.

FIG. 7 is an example of the device composition for realizing a second embodiment of the invention. The device includes a voice entry component 1, an A/D converter 2, a voice analysis component 3, a word data for artificial learning creation component 4, an entered data storage component 5, and a learned data storage component 6.

The aforementioned word data for artificial learning creation component 4 is equipped with a standard speaker code data storage component 44 for storing standard speaker data (code vector), a learned speaker code data storage component 45 for storing learning speaker data (code vector), and a code data conversion processing component 46. The word data for artificial learning creation component 4 performs the process heretofore described.

With the several freely selected standard speakers from among the verbal data of the several hundred persons already held as the database, the standard speaker code book is created by the vector quantization of the verbal data of each of the standard speakers. The standard speaker code book data is stored in the standard speaker code data storage component 44. The speakers other than the standard speakers are designated as learning speakers and the verbal data of each of the learning speakers is designated as learning speaker data. The learning speaker code book is created by mapping the code vectors for 200 words in relation to the learning speaker data from each of the standard speaker code books. The learning speaker code book is stored in the learned speaker code data storage component 45.

When creating data for learning with regard to words that are not in the database, each of the standard speakers speaks the new word. That voice is entered into the A/D converter 2 through the voice entry component 1. After being A/D converted, the voice signal is converted by the voice analysis component 3 to the characteristic vector that is indicated by, for example, the 10 dimensional LPC [phonetic: cepstrom] coefficient. The characteristic vector is then stored in the entered data storage component 5.

Then, the code data converting processor 46, after performing vector quantization on the characteristic vector using the standard speaker code book, maps the characteristic vector to each of the learned speaker code books. The word data for artificial learning created in this manner is stored in the learning data storage component 6.

Thus, when creating a voice model for words that are not in the database, learned data of such words can be created based on the verbal data spoken by the several standard speakers, as described in the first embodiment. Therefore, it is no longer necessary to collect data from several hundred persons in order to create a voice model for a new word, as was done in the conventional art. Thus, a voice model can be created in a short period of time.

In the second embodiment, since the process is performed by the vector quantization of the data, the data may be slightly rough. However, there is the advantage of being able to greatly reduce the amount of processing.

In the first and second embodiments described above, when obtaining the verbal data by the standard speaker speaking the new word, it is best to obtain each verbal data by having the word spoken not just one time, but a plurality of times, in order to obtain a large variation of data corresponding to the fluctuation in length of speech.

Further, after creating the learning data for the new word and using the learning data when learning the voice model, it is best to perform the learning by using not only the learned data but also the data spoken by the standard speaker.

In each of the embodiments described above, several speakers were selected as standard speakers. However, it is possible to use only one person. Nonetheless, it is best if several persons are used as standard speakers so as to provide a wide variation in the learning data for the same word, thereby making possible uniformly favorable learning results.

When several persons are used as standard speakers, the selection of the standard speaker may also be performed for each of the learning speakers. In other words, if there were, for example, five standard speakers and 200 learning speakers, then the word data for artificial learning would be created having 1000 variations for the one word that is to be newly added to the database. This, of course, has the advantage of having a greater number of variations, but it also requires a greater processing time when learning. Thus, the standard speaker of nearest distance is selected and the learning data can be created based on the word data for an artificial speaker obtained by mapping the verbal data of the selected standard speaker. Hence, learning effectiveness may also be accomplished in this way.

Consider, for example, the first learning speaker. The first learning speaker creates the learning data based on the word data for an artificial speaker obtained by mapping only the spoken data of the first standard speaker, when the spoken data of the first standard speaker from among the five standard speakers is determined to be the closest as compared to the verbal data of the other standard speakers.

Thus, the one standard speaker data with the nearest distance to the one learning speaker is selected. If the word data for the artificial learning speaker is created in relation to the selected standard speaker, then it is possible to significantly improve the efficiency of the process to follow thereafter.

When attempting to create a new voice model for use by children, it is not necessary to collect data from several hundred children. Instead, data from adult females is selected which is in close proximity. By mapping the voice data of the adult females selected as standard speakers to the data for the children already held in the database, the learning data of the new word for use by children is created. Thus, based on such learning data, it becomes possible to create a voice model of a new word.

Further, the present invention can apply to not only learning of the DRNN voice model, but to other voice models of neural networks, as well as to learning in voice models of other types of voice recognition means, such as a voice model with a delayed (Markov-phonetic) method (HMM method). In addition, the present invention is not limited to each of the embodiments described above, but relates to all other variations of embodiments that do not compromise the essence of the invention.

Further, the processing program which performs the process of the present invention described above is capable of storing data to a storage medium, such as a floppy disk, optical disc, hard disk and so forth. The present invention includes such storage medium and may also take the form of obtaining data from a network.

The present invention, as described above, makes possible the creation of a new voice model with a low cost and in a short time period, without requiring the creation of learning data by the collection of verbal data from several hundred persons in order to create a voice model for a new word. Thus, it becomes possible to provide a voice model of a word that is not held in the database inexpensively and in a short delivery period when receiving an order from a user.

What is claimed is:

1. A voice model learning data creation method for creating learning data relative to new words in order to obtain a voice model used for voice recognition, comprising the steps of:
   obtaining standard speaker data from a preestablished database, where the standard speaker data includes speech data of at least one individual;
   generating a conversion function for converting data from a standard speaker data storage component to a learning speaker data storage component;
   analyzing the frequency of voice signals of the speech data existing in the standard speaker data storage component and in the learning speaker data storage component to obtain new words;
   respectively generating a characteristic vector for each new word obtained; and
   using the conversion function to respectively convert the new words from the standard speaker data storage component to the learning speaker data storage component respectively using differential vectors between the characteristic vectors of the new words in the standard speaker data storage component and the characteristic vectors of respective words in the learning speaker data storage component and respectively weighting distances between the characteristic vectors of the new words and the characteristic vector of an already existing word being held in the database, thereby creating learning data relative to the new words.

2. A voice model learning data creation method for creating learning data relative to new words in order to obtain a voice model used for voice recognition, comprising the steps of:
   obtaining standard speaker data from a preestablished database, where the standard speaker data includes speech data of at least one individual;
   generating a conversion function for converting data from a standard speaker data storage component to a learning speaker data storage component;
   analyzing the frequency of voice signals of the speech data existing in the standard speaker data storage component and in the learning speaker data storage component to obtain new words;
   respectively generating vector quantized code data of a characteristic vector for each new word obtained;
   storing the new word code data in the standard speaker data storage component; and
   mapping the new word code data from the standard speaker data storage component to the learning speaker data storage component by using the conversion function, thereby creating learning data relative to the new words.

3. A voice model learning data creation apparatus used in voice recognition to create learning data relative to new words in order to obtain a voice model, comprising:
   a preestablished database having speech data obtained from multiple speakers;
   a standard speaker data storage component which stores speech data of at least one speaker selected from the preestablished database;
   a learning speaker data storage component which stores speech data of those speakers, other than the standard speakers, whose speech data is stored in the preestablished database;
   an artificial learning word data creation component having a data conversion component which accomplishes data conversion from the standard speaker data storage component to the learning speaker data storage component using a preobtained conversion function; and
   a learning data storage component which stores learning data created by the artificial learning word data creation component,
   wherein, at the time of creating learning data relative to new words, data is obtained from standard speakers speaking the new words and is converted to the learning speaker data storage component by the artificial learning word data creation component, thereby creating artificial learning word data relative to the new words which is used to create learning data,
   the standard speaker data storage component stores standard speaker data,
   the learning speaker data storage component stores learning speaker data,
   the standard and learning speaker data are characteristic vectors for the respective words obtained through a frequency analysis of voice signals, and
   the process for converting the data obtained through the speech of standard speakers with regard to new words uses the preobtained conversion function determined by using differential vectors between the characteristic vectors of the respective words in the standard speaker data storage component and the characteristic vector of respective words in the learning speaker data storage component and weighting distances between the characteristic vectors of the respective words and the characteristic vector of an already existing word being held in the database.

4. A voice model learning data creation apparatus used in voice recognition to create learning data relative to new words in order to obtain a voice model, comprising:
   a preestablished database having speech data obtained from multiple speakers;
   a standard speaker data storage component which stores speech data of at least one speaker selected from the preestablished database;

a learning speaker data storage component which stores speech data of those speakers, other than the standard speakers, whose speech data is stored in the preestablished database;

an artificial learning word data creation component having a data conversion component which accomplishes data conversion from the standard speaker data storage component to the learning speaker data storage component using a preobtained conversion function; and a learning data storage component which stores learning data created by the artificial learning word data creation component, wherein, at the time of creating learning data relative to new words, data is obtained from standard speakers speaking the new words and is converted to the learning speaker data storage component by the artificial learning word data creation component, the standard speaker data storage component stores standard speaker data, the learning speaker data storage component stores learning speaker data, the standard and learning speaker data are vector quantized code data of the characteristic data for each respective word obtained through the frequency analysis of voice signals, and the process for converting the data obtained through the speech of standard speakers with regard to new words generates vector quantized code data for the new words, and uses the preobtained conversion function determined from the vector quantized code data of the standard and learning speaker data to map the new word code data to the learning speaker data storage component thereby creating artificial learning word data relative to the new words which is used to create learning data.

5. A voice model learning data creation apparatus used to create learning data relative to new words, comprising:

means for obtaining standard speaker data from a preestablished database, where the standard speaker data includes the speech data of at least one individual;

means for generating a conversion function for converting data from a standard speaker data storage component to a learning speaker data storage component;

means for analyzing the frequency of voice signals of the speech data existing in the standard speaker data storage component and in the learning speaker data storage component to obtain new words;

means for respectively generating a characteristic vector for each new word obtained; and means for using the conversion function to convert the new words from the standard speaker data storage component to the learning speaker data storage component by respectively using differential vectors between the characteristic vectors of the new words in the standard speaker data storage component and the characteristic vectors of new words in the learning speaker data storage component and respectively weighting distances between the characteristic vectors of the new words and the characteristic vector of an already existing word being held in the database, thereby creating learning data relative to the new words.

6. A voice model learning data creation apparatus used to create learning data relative to new words, comprising:

means for obtaining standard speaker data from a preestablished database, where the standard speaker data includes the speech data of at least one individual;

means for generating a conversion function for converting data from a standard speaker data storage component to a learning speaker data storage component;

means for analyzing the frequency of voice signals of the speech data existing in the standard speaker data storage component and in the learning speaker data storage component to obtain new words;

means for respectively generating vector quantized code data of a characteristic vector for each new word obtained;

means for storing the new word code data in the standard speaker data storage component; and means for mapping the new word code data from the standard speaker data storage component to the learning speaker data storage component by using the conversion function, thereby creating learning data relative to the new words.

* * * * *